United States Patent Office 3,012,999
Patented Dec. 12, 1961

3,012,999
COPOLYMERS OF VINYL CHLORIDE
Ernest Antonin Evieux, Le Peage du Roussillon, France, assignor to Societe des Usines Chimiques Rhone-Poulenc, Paris, France, a French body corporate
No Drawing. Filed Feb. 10, 1958, Ser. No. 714,075
4 Claims. (Cl. 260—87.5)

The present invention concerns new copolymers of vinyl chloride which are stable to light and heat.

While it is known to incorporate organo-tin compounds in halogenated polyvinyl resins in order to stabilise them, it is difficult to incorporate them satisfactorily in the unplasticised polyvinyl compositions employed in the production of rigid articles, since in order to obtain a uniform distribution, it is necessary to employ considerable quantities of stabiliser or to use solvents which must afterwards be evaporated. Moreover these unplasticised compositions do not completely resist the high temperatures necessary for working and shaping them, since at such temperatures the organo-tin compounds are liable to be decomposed and/or to migrate to the surface of the articles, as also to volatilise at least partially.

It is an object of the present invention to provide a method whereby these disadvantages can be mitigated or overcome.

The present invention comprises, as new substances, copolymers of vinyl chloride and, as a minor constituent, an organo-tin compound having a vinyl group directly attached to the tin atom. The other groups attached to the tin may be hydrocarbon radicals or acyloxy groups or both; usually they will comprise either three hydrocarbon radicals or two hydrocarbon radicals and one acyloxy group. The hydrocarbon radicals may be aliphatic or aromatic, substituted or unsubstituted, and when there is more than one they may be the same or different; preferably they are alkyl groups containing up to four carbon atoms. The acyloxy group is the non-hydrolysable radical of an aliphatic or aromatic carboxylic acid, and preferably contains at least 6 carbon atoms.

These organo-tin compounds may be obtained, for example, by the action of a vinyl magnesium halide on a halogenated derivative of tin, which may be partially substituted by a hydrocarbon radical other than vinyl, in accordance with the reaction:

$$CH_2{:}CH{-}MgHal + Hal_nSnR_{(4-n)} \rightarrow$$
$$CH_2{:}CH.SnHal_{(n-1)}R_{(4-n)} + MgHal_2$$

in which R is a hydrocarbon radical other than vinyl and $n$ is a whole number from 1 to 4.

When $n$ is equal to 1, there is obtained an organo-tin compound containing a vinyl radical and 3 hydrocarbon radicals other than vinyl.

If $n$ is higher than 1, the vinyl tin compound obtained still contains one or more halogen atoms in addition to the vinyl radical and possibly other hydrocarbon radicals. These halogen atoms are labile, and may be replaced by acyloxy radicals, for example by the action of an alkali metal or other salt of organic acid on the vinyl tin compound. In this way there can be obtained vinyl tin compounds which contain, apart from the vinyl group, only acyloxy groups or both acyloxy groups and hydrocarbon radicals other than vinyl.

Examples of vinyl tin compounds containing no acyloxy groups are monovinyltriethyl tin and monovinyltributyl tin. An example of a vinyl tin compound containing both hydrocarbon radicals and an acyloxy group is monovinyldiethyl tin laurate.

While the copolymers of the invention comprise vinyl chloride as the major component, they may also have other polymerisable monomer components, especially vinyl compounds such as vinyl acetate. Thus a mixture of vinyl chloride and vinyl acetate containing 85–95% of vinyl chloride may be copolymerised with the vinyl tin compound. Quite a low proportion of the vinyl tin compound, usually 0.1–5%, is sufficient to confer on the copolymer a satisfactory degree of stability. The copolymerisation is preferably effected by the well-known emulsion technique, using as the reaction medium water containing a suitable dispersing agent and a catalyst for vinyl polymerisations.

The copolymers of the invention have substantially the same physical and mechanical properties as similar copolymers containing no vinyl tin compound, except that they are more stable to heat and light. They can be worked by the conventional methods of working polyvinyl chloride. Their stability to heat and light is however good, and as the tin forms an integral part of the macromolecular structure it can neither migrate nor volatilise, nor can it be extracted by liquids with which the copolymer comes into contact.

The following example illustrates the invention without limiting it. The parts are by weight.

*Example*

Into an autoclave provided with an agitating system were introduced 250 parts of water, 0.5 part of partially saponified polyvinyl acetate, 1.5 parts of lauryl peroxide and 2 parts of monovinyldiethyl tin laurate; the air was then replaced by nitrogen, after which 150 parts of vinyl chloride were fed in. Part of this was blown off in order to remove the last traces of oxygen leaving in the autoclave 100 parts of vinyl chloride.

The mixture was heated with agitation for 7 hours at 50–51° C., the pressure rising to a maximum of 7.2–7.3 atmospheres. Heating was stopped when the pressure had fallen again to about 4 atmospheres.

The unpolymerised monomeric vinyl chloride was then blown off and the copolymer obtained was centrifuged, washed with distilled water and dried.

74 parts of copolymer, in the form of a sandy powder, were obtained. Its specific viscosity was 0.656, as determined on a solution of concentration of 5 grams per litre in cyclohexanone at 25° C.

In order to demonstrate the stability to heat of the copolymer, heating tests were made both on the unplasticised copolymer powder, both unwashed and washed with ethanol, and also on plasticised compositions. The unplasticised powder was compressed in a Carver press at 180° C. and maintained at this temperature for 10 minutes. Discs having a light-yellow tint were obtained. Polyvinyl chloride powders obtained by polymerisation under exactly the same conditions, but in the absence of vinyldiethyl tin laurate, gave dark brown discs.

The plasticised composition was prepared by mixing 65 parts of copolymer with 35 parts of bis-(2-ethylhexyl) phthalate and the mixture was worked for one hour in a roll-type mixer heated to 157° C. A substantially colourless plasticised sheet was obtained, while a plasticised polyvinyl chloride mixture prepared in the absence of vinyldiethyl tin laurate gave sheets having a brownish-yellow coloration.

In order to prove that a true copolymer of the monovinyldiethyl tin laurate and the polyvinyl chloride had been formed, two series of tests were made:

(a) The copolymer was systematically extracted with ethanol (in which the monovinyldiethyl tin laurate is soluble), and was then subjected, after plasticisation, to hot calendering under the same conditions as above. The sheets obtained remained substantially colourless. If the monovinyldiethyl tin laurate were not at least partially copolymerised with the vinyl chloride, the sheets obtained from the extracted copolymer would have become brown in the same way as those made of the unstabilised polyvinyl chloride.

(b) The copolymer, after being washed with ethanol, was precipitated from solution in a series of fractions, in each of which the tin was estimated. To do this the copolymer was dissolved at a concentration of 15 grams per litre in tetrahydrofuran, and water was progressively added to the solution. Five successive fractions were separated and each fraction was redissolved in tetrahydrofuran and reprecipitated by means of a sufficient quantity of ethanol, washed 3 times with ethanol and dried, and the tin estimated. The following table indicates the percentage of tin expressed as vinyldiethyl tin laurate in the various fractions.

| Fraction: | Tin percent |
|---|---|
| 1 | 0.24 |
| 2 | 0.24 |
| 3 | 0.25 |
| 4 | 0.28 |
| 5 | 0.25 |

Since the tin was found distributed more or less uniformly in all the fractions, it is clear that the vinyldiethyl tin laurate had copolymerised uniformly with the vinyl chloride.

I claim:
1. As new substances, copolymers of vinyl chloride having vinyl chloride units as the major component and, as a minor component units of an organo-tin compound containing a vinyl group, two alkyl groups containing up to 4 carbon atoms, and a saturated aliphatic carboxylic acyloxy group containing more than 6 carbon atoms, all of said groups being attached directly to the same tin atom.

2. As new substances, copolymers of vinyl chloride having vinyl chloride units as the major component and, as a minor component, monovinyl diethyl tin laurate.

3. Copolymers according to claim 1, containing 0.1–5% of the organo-tin compound.

4. Copolymers according to claim 2, containing 0.1–5% by weight of the said monovinyl diethyl tin laurate.

References Cited in the file of this patent
UNITED STATES PATENTS

| 2,267,779 | Ygnve | Dec. 30, 1941 |
| 2,873,287 | Ramsden | Feb. 10, 1959 |

OTHER REFERENCES

Seyferth et al.: Jour. of American Chemical Society, vol. 79, pp. 515–17, Feb. 5, 1957.

UNITED STATES PATENT OFFICE
CERTIFICATE OF CORRECTION

Patent No. 3,012,999            December 12, 1961

Ernest Antonin Evieux

It is hereby certified that error appears in the above numbered patent requiring correction and that the said Letters Patent should read as corrected below.

In the heading to the printed specification, between lines 6 and 7, insert the following:

Claims priority, application France Feb. 12, 1957

Signed and sealed this 18th day of September 1962.

(SEAL)
Attest:

ERNEST W. SWIDER            DAVID L. LADD
Attesting Officer            Commissioner of Patents